United States Patent [19]
Belforte et al.

[11] 4,386,425
[45] May 31, 1983

[54] SWITCHING UNIT FOR THE TRANSFER OF DIGITIZED SIGNALS IN PCM SYSTEM

[75] Inventors: Piero Belforte; Bruno Bostica; Luciano Pilati, all of Turin, Italy

[73] Assignee: Cselt - Centro Studi e Laboratori Telecomunicazioni S.p.A., Turin, Italy

[21] Appl. No.: 262,933

[22] Filed: May 12, 1981

[30] Foreign Application Priority Data

May 13, 1980 [IT] Italy .................. 67745 A/80

[51] Int. Cl.³ .......................................... H04Q 11/04
[52] U.S. Cl. ..................................................... 370/66
[58] Field of Search ..................... 370/66, 56, 59, 67, 370/61, 63; 179/18 FC

[56] References Cited

U.S. PATENT DOCUMENTS 4,093,827  6/1978  Charransol et al. .................. 370/66
4,154,982  5/1979  Charransol et al. .................. 370/62

Primary Examiner—Thomas A. Robinson
Attorney, Agent, or Firm—Karl F. Ross

[57] ABSTRACT

A switching unit for the selective transfer of bytes concurrently arriving in successive time slots over eight incoming signal paths to as many outgoing signal paths with intervening temporal and/or spatial transposition comprises a byte memory loaded by way of a series/parallel converter and read out by way of a parallel/series converter; two 8×8 storage matrices may alternately serve as the two converters. A routing memory, connected via a logic network to a command unit such as a microprocessor, controls the transfer and may also block the readout from the byte memory under certain conditions, specifically during an initiation procedure or where the switching unit is one of several such units forming part of a larger switching or concentration structure. In response to particular instructions from the command unit, a single byte from an incoming path may be transferred to one or all of the outgoing paths.

9 Claims, 5 Drawing Figures

SWITCHING UNIT FOR THE TRANSFER OF DIGITIZED SIGNALS IN PCM SYSTEM

FIELD OF THE INVENTION

Our present invention relates to a switching unit operating in the time-division-multiplexing (TDM) mode for the selective transfer of binary code words such as 8-bit words or bytes, arriving simultaneously during individual time slots of a recurrent frame period over a plurality of incoming signal paths, to a like plurality of outgoing signal paths with intervening temporal and/or spatial transposition.

BACKGROUND OF THE INVENTION

In the usual PCM (pulse-code-modulation) telephone or other telecommunication system, such a frame period may be divided into 32 time slots assigned to respective signal channels including, say, 30 voice channels and two service channels; thus, a group of 32 channels is allotted to each signal path. Each time slot generally has a duration of approximately 4 $\mu$s equaling—with 8-bit coding of digitized voice samples—eight bit intervals of 500 ns duration. The temporal ad/or spatial transposition enables the transfer of voice samples or supervisory signals from any incoming channel to any outgoing channel, on the same or a different signal path, communicating therewith.

A switching unit or symmetrical time-division matrix (STM) of this type has been disclosed, for example, in U.S. Pat. Nos. 4,093,827 and 4,154,982. As particularly described in the first one of these patents, a series/parallel converter concurrently receives during each time slot the serially arriving bits of respective bytes from eight incoming signal paths or junctions which are then transmitted in parallel, one byte at a time, to a speech memory for temporary storage in respective cells thereof. The readout from the memory, under the control of address instructions from an external source acting as a telephone marker, occurs by way of a serializer receiving the bits of each byte in parallel from the memory and delivering them sequentially, during a designated time slot, to the outgoing signal path or junction for which they are intended.

OBJECTS OF THE INVENTION

An object of our present invention is to improve the versatility of a switching unit of this general type in order to facilitate its co-operation with a command unit such as a microprocessor in the performance of operations other than a mere linking of intercommunicating PCM channels from a limited number of incoming and outgoing signal paths.

More particularly, our invention aims at providing a switching unit of this nature capable of being combined with similar units into a larger structure enabling the selective establishment of connections between several sets of incoming signal paths and one or more sets of outgoing signal paths.

It is also an object of our invention to provide means in such a switching unit for optionally blocking the readout of code words to any outgoing signal path, e.g. in order to terminate a connection or during an initiation procedure.

SUMMARY OF THE INVENTION

A switching unit according to our invention comprises a first read/write memory which has cells for the temporary storage of all the code words arriving during one frame period over all incoming signal paths and which is provided with loading means connectable to the incoming paths for inscribing arriving code words in its cells in a predetermined order, under the control of associated timing means, during one or more writing phases of each time slot of a frame period; the memory is further provided with unloading means connectable to the outgoing paths for reading out all (or, possibly, less than all) the inscribed code words in a sequence based on routing information stored in a second read/write memory. A scan of the cells of the latter memory during reading phases also recurring at least once per time slot yields the addresses of the cells of the first memory whose contents are to be consecutively read out to respective outgoing channels by the unloading means during a frame period; this second memory has input means for receiving such routing information in a writing phase as well as output means controlled by the timing means for delivering that information to an address input of the first memory during the reading phases. The routing information remains stored in the second memory until replaced by new information supplied during a writing phase in response to instructions from an associated command unit which are fed to decoding means including circuitry responsive to certain of these instructions for supplementing a stored cell address with an inhibiting or "busy" bit that is transmissible by the output means of the second memory and the address input of the first memory to the corresponding cell of the latter for blocking the transfer of its contents to any outgoing signal path.

In a larger switching array including two or more switching units according to our invention, whose respective unloading means are connected in parallel (with the aid of OR gates) to the same set of outgoing signal paths, the availability of such an inhibiting bit allows the blocking of the readout from any switching unit during one or more frame periods or during individual time slots thereof whereby these outgoing paths may selectively receive code words from different sets of incoming signal paths respectively terminating at the several units. The readout of an individual switching unit may also be blocked for the duration of a frame period in the event of an interruption of normal operation and initiation of a new microprogram.

BRIEF DESCRIPTION OF THE DRAWING

The above and other features of our invention will now be described in detail with reference to the accompanying drawing in which.

SPECIFIC DESCRIPTION

Figure 1:
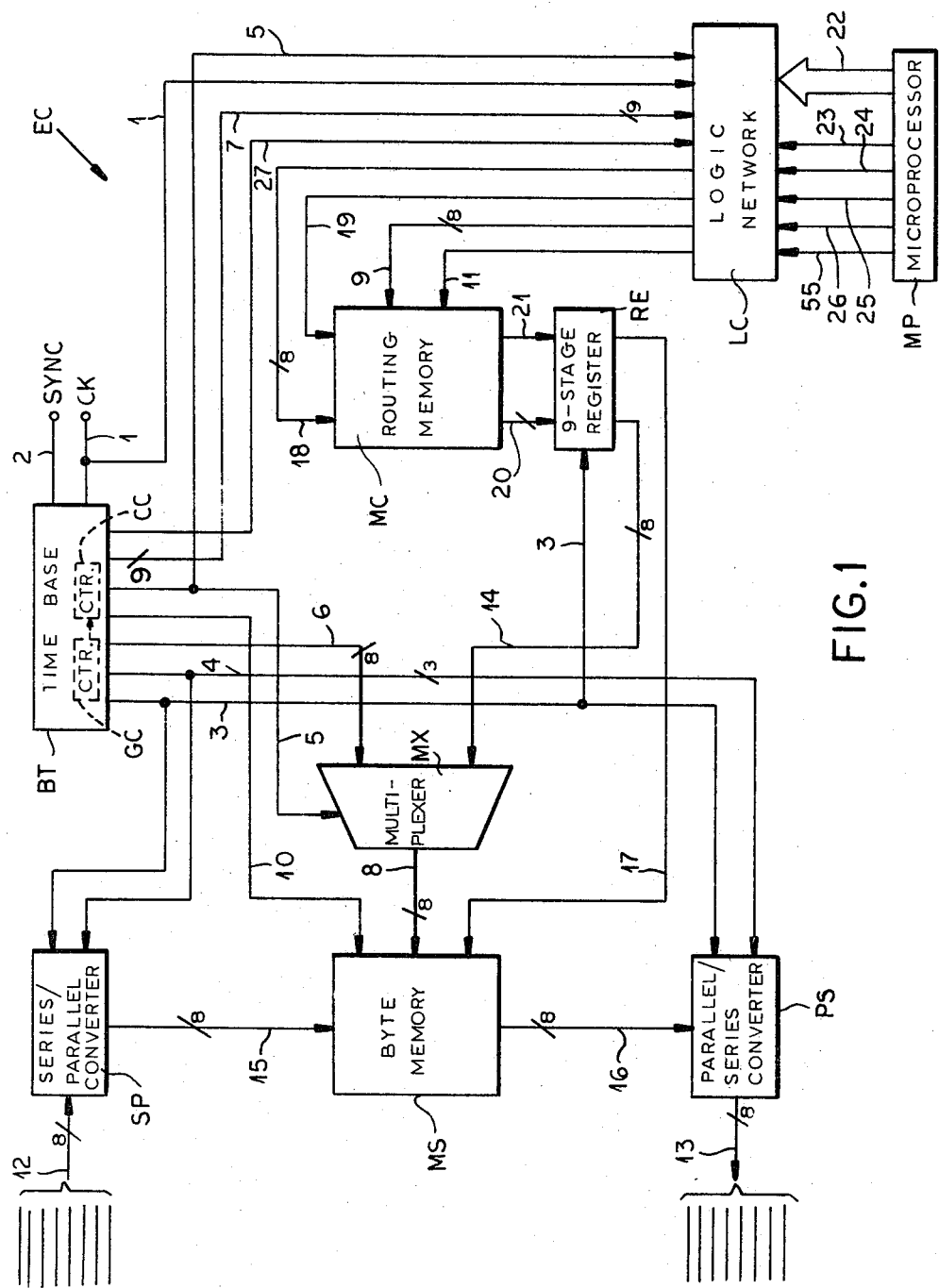
FIG. 1 is a block diagram of a switching unit embodying the present improvement.

In FIG. 1 we have shown a TDM switching unit EC for the selective transfer of voice samples (digitized as bytes) from eight incoming signal paths, collectively designated 12, to eight outgoing signal paths, collectively designated 13. Signal paths 12, each carrying bits from 32 channels assigned to respective time slots of a recurrent frame period, terminate at a series/parallel converter SP from which an 8-lead multiple 15 extends to a loading input of a byte memory MS. An 8-lead multiple 16 extends from an unloading output of memory MS to a parallel/series converter PS working into the outgoing signal paths 13. The two converters SP and PS are controlled by stepping pulses on an output lead 3 and by 3-bit transfer codes on a 3-lead output multiple 4 of a time base BT receiving clock pulses CK at a cadence of 4.096 MHz on a wire 1 and frame-synchronizing pulses SYNC at a cadence of 8 KHz on a wire 2 from a nonillustrated master clock. The stepping pulses on lead 3 have half the cadence of clock pulses CK, thereby establishing a bit interval or operating cycle of approximately 500 ns. A 3-stage group counter GC advanced by the stepping pulses generates the transfer codes.

Time base BT further emits switching pulses, in the form of a square wave with a frequency of 2.048 MHz corresponding to the cadence of the stepping pulses, on a lead 5 with branches terminating at a multiplexer MX and at a logic network LC. Group counter GC is in cascade with a 5-stage channel counter CC; the stages of both counters are connected to respective leads of a multiple 7 also having one lead tied to wire 2 for receiving the frame-synchronizing pulses SYNC. Thus, counters GC and CC generate 8-bit address codes whose three lowest-ranking bits identify the group and whose five highest-ranking bits identify the channel involved at a given instant in a transfer operation. The same address codes are further delivered by a multiple 6 to one input of multiplexer MX from which a multiple 8 extends to an address input of memory MS. Write-enabling pulses coinciding with the switching pulses on lead 5 are also sent to a read/write input of memory MS and to logic network LC via respective leads 10 and 27.

Logic network LC receives data words, to be used as routing information for the readout of memory MS with the aid of another memory MC, as well as instruction words via a bus 22 from an associated command unit here shown as a microprocessor MP. Control signals are sent to network LC from the microprocessor via another bus comprising leads 23, 24, 25 and 26. A further control lead 55 serves for the initiation of a new series of operations.

Routing memory MC, having as many cells (256 in the present instance) as byte memory MS, serves for the storage of information idenifying the cells of memory MS whose contents are to be read out to converter PS during a reading phase. Memory MC has a main and an ancillary data input, respectively connected to an 8-lead multiple 18 and to a single lead 19 extending from network LC, and corresponding outputs connected via a multiple 20 and a lead 21 to a 9-stage buffer register RE with an 8-lead output multiple 14 connected to a second input of multiplexer MX and with a further output lead 17 terminating at a readout-inhibiting input of memory MS. Register RE stores the bits received from memory MC for subsequent readout under the control of the stepping pulses appearing on lead 3.

Finally, an 8-lead multiple 9 and a single lead 11 extend from logic network LC to an address input and to a read/write input of memory MC. A branch of wire 1, carrying the fast clock pulses CK, also terminates at that logic network.

The two converters SP and PS may be of the type described in the aforementioned prior U.S. Pat. No. 4,093,827, each converter comprising eight registers with different numbers of stages ranging from 8 through 15. These converters could be replaced, however, by a pair of orthogonal matrices with 64 storage elements each as described hereinafter with reference to FIG. 5. With the converters shown in FIG. 1, memory MS receives in one of its cells an incoming byte during a writing phase of each 500-ns bit interval and emits a byte during a reading phase of the same interval unless such emission is blocked by an inhibiting or "busy" bit received in the same reading phase from meory MC by way of leads 21 and 17. Memory MC, of course, will require nine storage elements per cell; all storage elements are to be nondestructively read out.

Figure 2:
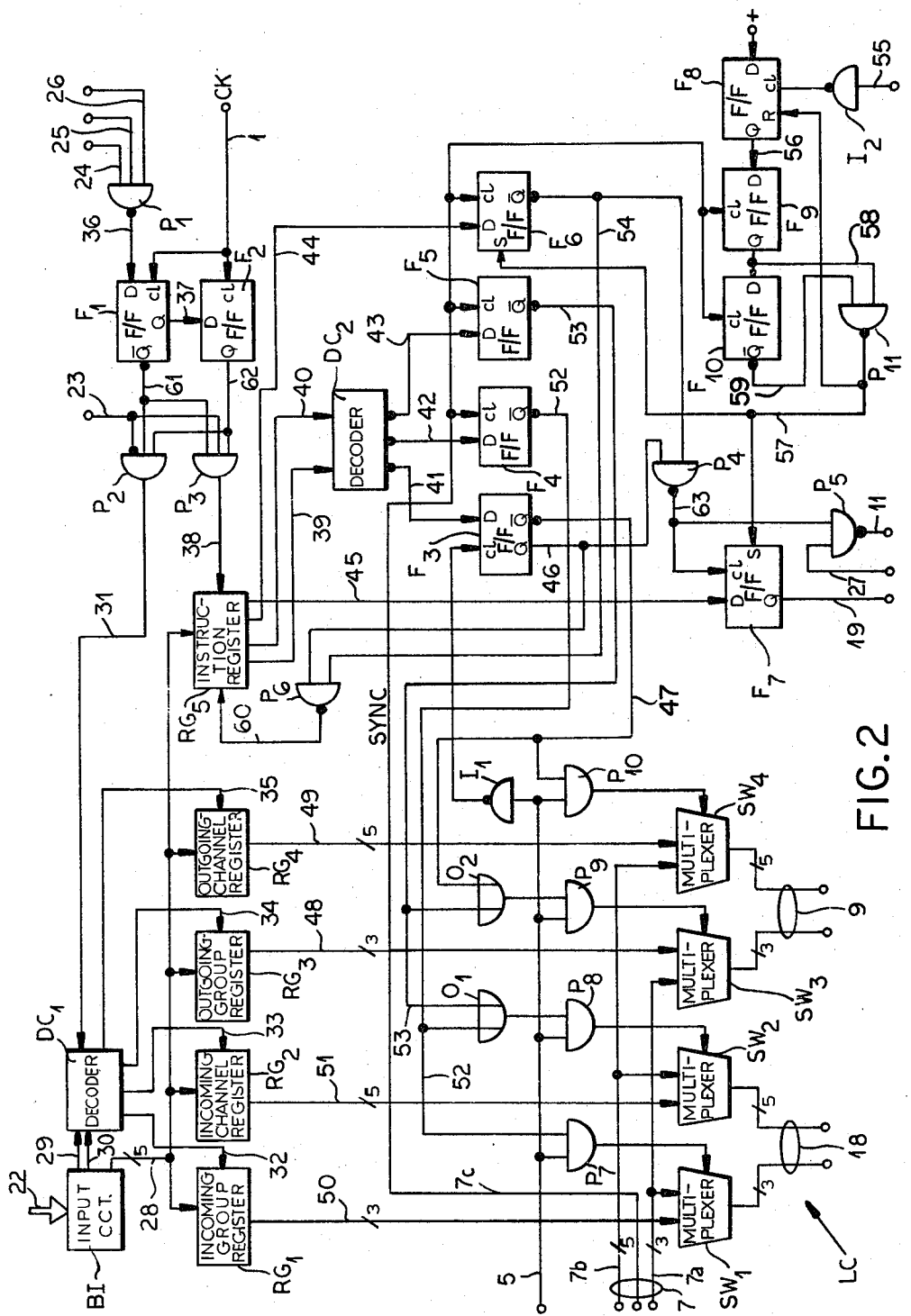
FIG. 2 is a more detailed circuit diagram of a logic network included in the switching unit of FIG. 1.

Reference will now be made to FIG. 2 for a description of logic network LC. This network comprises an input circuit BI to which 7-bit data words or 4-bit instruction words are transmitted from the microprocessor MR of FIG. 1 via bus 22. Two output leads 29 and 30, carrying the two highest-ranking bits of a data word, extend from circuit BI to a decoder $DC_1$; the latter also has an enabling input connected via a lead 31 to an output of an AND gate $P_2$ with an inverting input tied to lead 23 and with two noninverting inputs respectively connected by leads 61 and 62 to a reset output ($\overline{Q}$) of a D-type flip-flop $F_1$ and to a set output (Q) of a similar flip-flop $F_2$ whose clock inputs (cl) are connected in parallel to wire 1. The data input (D) of flip-flop $F_1$ is connected to an output lead 36 of a NAND gate $P_1$ with inputs respectively tied to leads 24, 25 and 26; its set output is connected via a lead 37 to the data input of flip-flop $F_2$. Leads 61 and 62 are additionally connected to two noninverting inputs of an AND gate $P_3$ whose third (also noninverting) input is tied to lead 23, gate $P_3$ having an output lead 38 connected to an enabling input of an instruction register $RG_5$. Four address registers $RG_1$, $RG_2$, $RG_3$ and $RG_4$ have enabling inputs connected to respective outputs of decoder $DC_1$ and have data inputs all connected to certain leads of a 5-lead multiple 28 extending from circuit BI. More particularly, register $RG_1$ receives a 3-bit code identifying one of the eight channel groups whose bytes arrive over respective incoming signal paths 12, register $RG_2$ receives a 5-bit code identifying one of the 32 channels of such a group, register $RG_3$ receives a 3-bit code identifying one of the eight channel groups allotted to the outgoing signal paths 13, and register $RG_4$ receives a 5-bit code identifying a particular channel of an outgoing channel group.

Registers $RG_1$–$RG_4$ have outputs linked by respective multiples 50, 51, 48 and 49 to corresponding inputs of four multiplexers $SW_1$–$SW_4$. These multiplexers form part of a switchover circuit adapted to connect the data multiple 18 and the address multiple 9 of memory MC (FIG. 1) either to the counters GC, CC of time base BT, generating sequential addresses, or to the registers $RG_1$–$RG_4$, storing the routing information received via data bus 22 from the microprocessor MP. For this purpose, multiplexers $SW_1$ and $SW_3$ have other inputs connected to a 3-lead submultiple 7a of multiple 7 emanating from group counter GC whereas multiplexers $SW_2$ and $SW_4$ have other inputs connected to a 5-lead submultiple 7b thereof emanating from channel counter SC. Multiples 50 and 48, respectively terminating at multiplexers $SW_1$ and $Sw_3$, also have three leads each whereas multiples 51 and 49, extending to multiplexers $SW_2$ and $SW_4$, are of the 5-lead type. Accordingly, the outputs of multiplexers $SW_1$ and $SW_2$ are respectively connected to three and five leads of multiple 18 while the outputs of multiplexers SW$_3$ and SW$_4$ are similarly connected to three and five leads of multiple 9.

Multiplexers SW$_1$–SW$_4$ have switching inputs connected to the outputs of respective AND gates P$_7$–P$_{10}$ each having one input tied to the lead 5 which carries the switching pulses emitted in the first half of each bit interval or memory cycle by time base BT; these gates can therefore conduct only during a writing phase. In the second half of each memory cycle, representing a reading phase, the multiplexers are invariably in a position in which data multiple 18 is connected via multiplexers SW$_1$ and SW$_2$ to registers RG$_1$ and RG$_2$ while address multiple 9 is connected via multiplexers SW$_3$ and Sw$_4$ to counters GC and CC of time base BT. The positioning of the multiplexers in a writing phase is determined by the contents of instruction register RG$_5$ with the aid of a decoder DC$_2$ having inputs connected to two output leads 39 and 40 of that register. Three inverting outputs of decoder DC$_2$, all energized in the absence of voltage on leads 39 and 40, are connected by respective leads 41, 42 and 43 to the data inputs of flip-flops F$_3$, F$_4$ and F$_5$. Two other such flip-flops F$_6$ and F$_7$ have data inputs connected via respective leads 44 and 45 to two further outputs of register RG$_5$. Flip-flop F$_3$ has its clock input connected by way of an inverter I$_1$ to lead 5 for possible switching at the midpoint of each memory cycle, i.e. at the beginning of each reading phase, by the trailing edges of the high-voltage half-cycles of the 2.048-MHz square wave emitted by time base BT. The clock inputs of flip-flops F$_4$, F$_5$ and F$_6$ are connected to a lead 7c of multiple 7 which is the one receiving the 8-KHz frame pulses SYNC from wire 2 (FIG. 1). Flip-flop F$_7$ has its clock input connected via a lead 63 to the output of a NAND gate P$_4$ having inputs tied via a lead 46 to the set output of flip-flop F$_3$ and via a lead 54 to the reset output of flip-flop F$_6$. Lead 63 also feeds one input of a NAND gate P$_5$ whose other input is tied to the ouput lead 27 of time base BT and whose output is joined to the lead 11 normally applying a read-enabling voltage to the read/write input of memory MC.

Flip-flop F$_3$ has a reset output connected via a lead 47 and an OR gate O$_2$ to a second input of AND gate P$_9$; another input of OR gate O$_2$ being tied to a lead 53 which originates at the reset output of flip-flop F$_5$ and further extends to an input of an OR gate O$_1$ working into a second input of AND gate P$_8$. A lead 52, connected to the reset output of flip-flop F$_4$, extends to second inputs of AND gate P$_7$ and OR gate O$_1$.

Output lead 55 of microprocessor MP is connected by way of an inverter I$_2$ to a clock input of a D-type flip-flop F$_8$ whose data input is permanently energized. Flip-flop F$_8$ has a set output joined by a lead 56 to the data input of a similar flip-flop F$_9$ whose own set output is connected by a lead 58 to an input of an AND gate P$_{11}$ as well as to the data input of a further flip-flop F$_{10}$. Gate P$_{11}$ has a second input connected by a lead 59 to the reset output of flip-flop F$_{10}$, its own output lead 57 being connected to a resetting input (R) of flip-flop F$_8$ and to setting inputs (S) of flip-flops F$_6$ and F$_7$. The latter flip-flop has a set output connected to the lead 19 which supplies the inhibiting bit to memory MC. Flip-flops F$_9$ and F$_{10}$ have their clock inputs joined to lead 7c. A NAND gate P$_6$ has inputs connected in parallel with those of gate P$_4$ to leads 46 and 54 and has an output lead 60 terminating at a clearing input of register RG$_5$.

Figure 3:
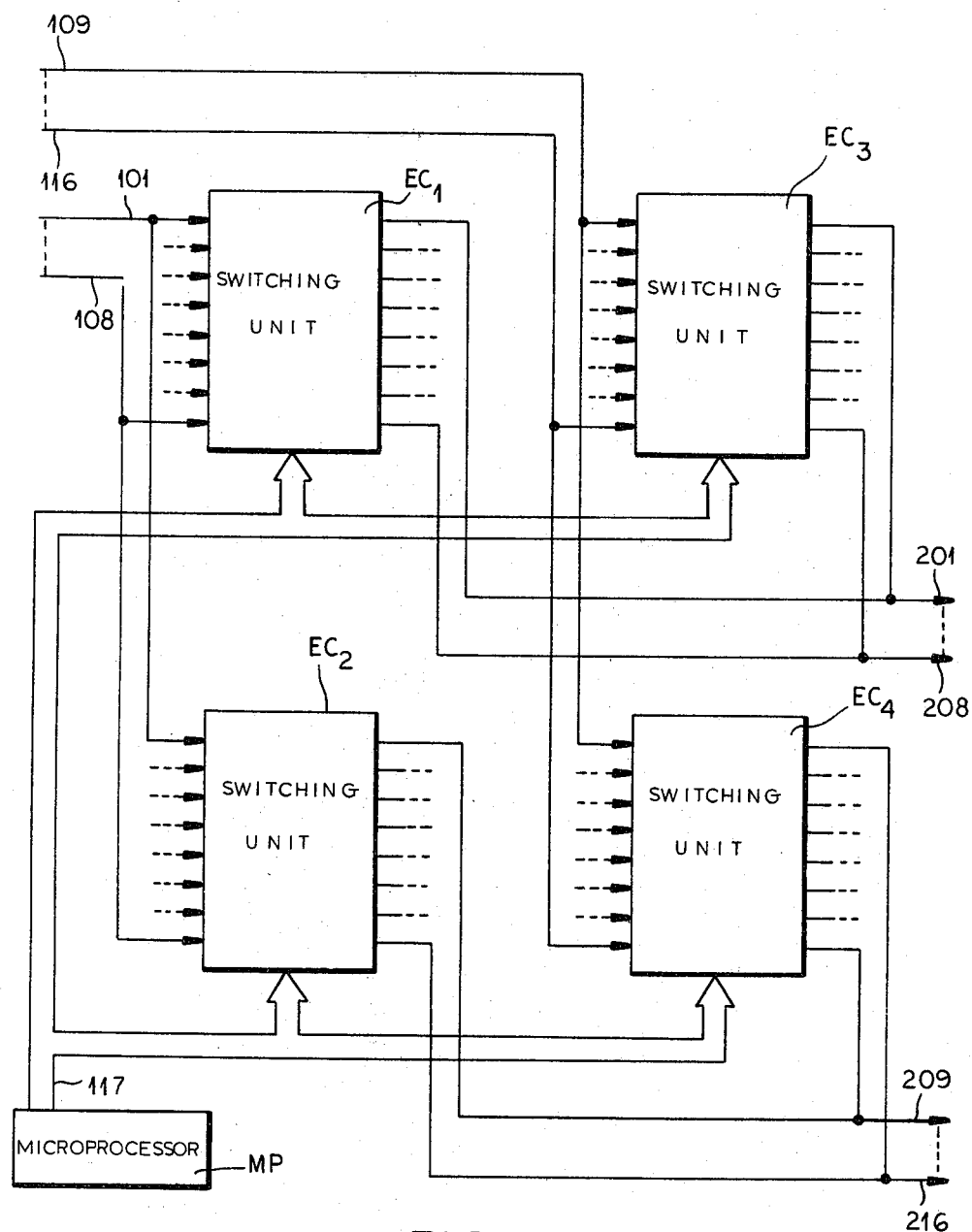
FIGS. 3 and 4 show two switching arrays each including several units of the type shown in FIG. 1.
Figure 4:
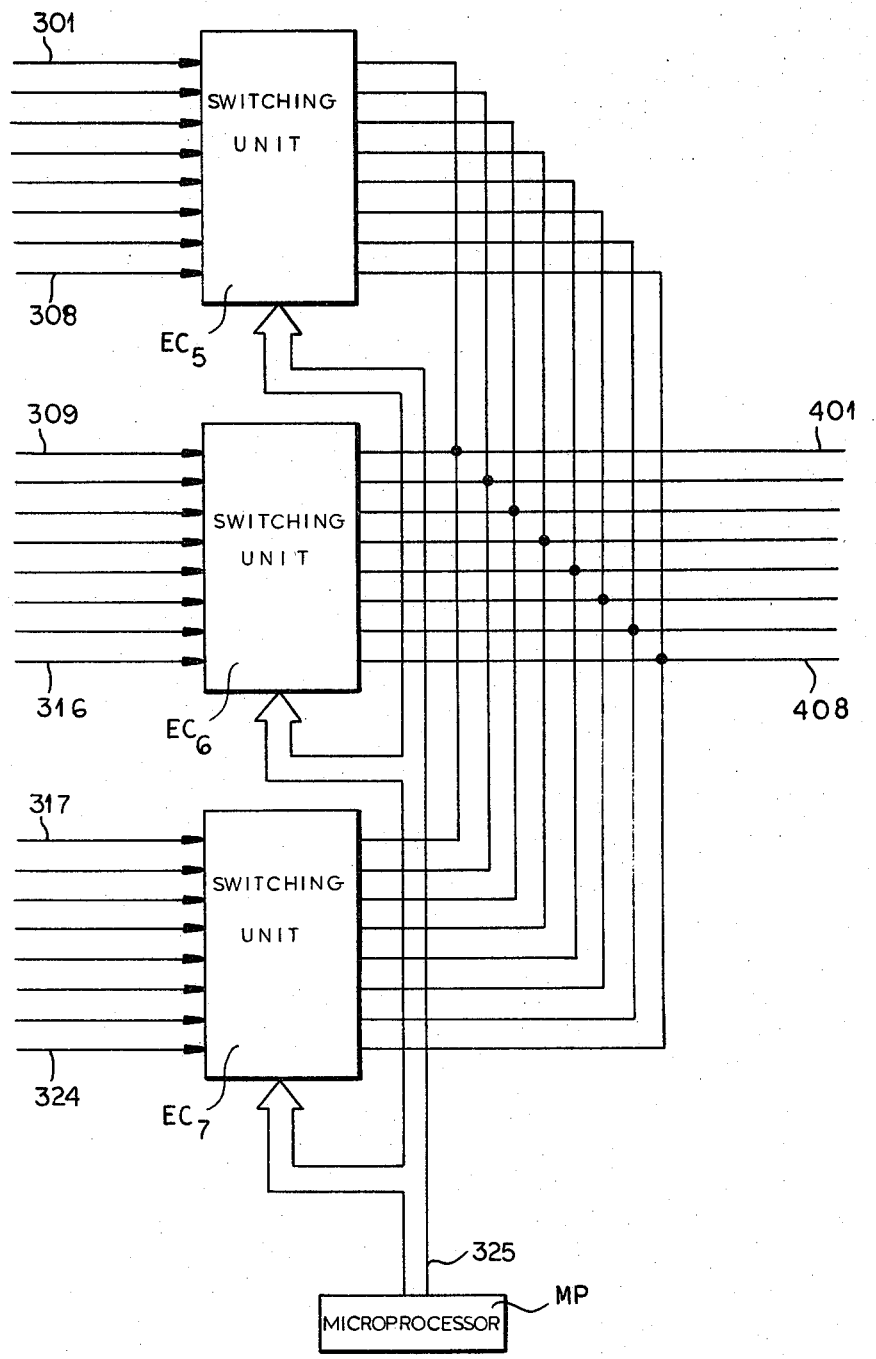

In the operation of logic network LC, NAND gate P$_1$ is cut off by the simultaneous energization of leads 24, 25 and 26 with respective control signals including a transfer command from microprocessor MP, a write-enabling signal indicating the availability of data or instructions at the microprocessor, and a selection signal identifying the switching unit EC of FIG. 1 among several such units in an array such as those shown in FIGS. 3 and 4. Since these signals occur asynchronously with respect to the operating cycles of unit EC, they will be made effective only upon the appearance of a clock signal CK on wire 1. Flip-flop F$_1$, previously set along with flip-flop F$_2$, will then be reset so as to energize its output lead 61 while the output lead 62 of flip-flop F$_2$ is still energized. For half a bit interval, therefore, AND gate P$_3$ or AND gate P$_2$ will conduct, depending on whether or not lead 23 carries voltage. If the message arriving from the microprocessor contains routing information, lead 23 will be de-energized so that gate P$_2$ conducts and via lead 31 enables the decoder DC$_1$ to switch one of registers RG$_1$–RG$_4$ (identified by a 2-bit code on leads 29 and 30) to the corresponding leads of output multiple 28 for receiving respective address bits from circuit BI. If the message is an instruction, voltage on lead 23 opens AND gate P$_3$ whereby register RG$_5$ is enabled through lead 38 to receive that instruction via the same multiple.

When no instruction word is stored in register RG$_5$, its output leads 39, 40, 44 and 45 are de-energized whereas output leads 41–43 of decoder DC$_2$ are active. Thus, flip-flop F$_3$, F$_4$ and F$_5$ are set and the voltage on their output leads 47, 52 and 53 is low, cutting off the four AND gates P$_7$–P$_{10}$ of the switchover circuit. In the writing phase of each operating cycle, therefore, multiplexers SW$_3$ and SW$_4$ are respectively connected to submultiples 7a and 7b whereas multiplexers SW$_1$ and SW$_2$ communicate with registers RG$_1$ and RG$_2$, the same as in a reading phase. With flip-flop F$_6$ reset, however, leads 46 and 54 are both at a high logic level so that NAND gates P$_4$ and P$_6$ are also cut off; since gate P$_5$ is blocked by gate P$_4$, the write-enabling pulses periodically appearing on lead 27 are prevented from interrupting the read-enabling voltage normally present on lead 11 whereby the contents of memory MC remain unchanged, permitting continuing communication between interconnected pairs of PCM channels.

When a new connection is to be established, the identities of the incoming and outgoing groups and channels concerned are successively sent by microprocessor MP over data bus 22 and are entered in the corresponding registers RG$_1$–RG$_4$ as described above. Next, the microprocessor transmits a single-connection instruction to be stored in register RG$_5$; in response thereto, decoder DC$_2$ de-energizes its output lead 41 whereby flip-flop F$_3$ is reset in the next reading phase and reverses the voltage levels of its output leads 46 and 47 with resulting conduction of NAND gates P$_4$ and P$_6$ and with unblocking of gates P$_5$, P$_9$ and P$_{10}$. Voltage on lead 60 then clears the register RG$_5$, allowing flip-flop F$_3$ to return to its previous set state in the immediately following reading phase; in the intervening writing phase, though, multiplexers SW$_3$ and SW$_4$ are switched onto the output multiples 48 and 49 of the associated address registers RG$_3$ and RG$_4$ while the voltage on lead 11 changes to a low level enabling writing in memory MC. Thus, the address of a cell of memory MS stored in registers RG$_1$ and RG$_2$ is entered by way of multiple 18 in a cell of memory MC identified by the contents of registers RG$_3$ and RG$_4$ appearing at that instant on multiple 9. No further writing is possible in memory MC until another instruction is supplied by the microprocessor.

The same procedure can be used to interrupt or terminate an existing connection by the insertion of an inhibiting bit in the corresponding cell of memory MC. In this instance, however, the instruction word received from the microprocessor and stored in register RG$_5$ also causes energization of its output lead 45 so that, upon conduction of NAND gate P$_4$, flip-flop F$_7$ is set and generates a high logic level on its output lead 19 terminating at the ancillary data input of memory MC. The contents of registers RG$_1$ and RG$_2$, concurrently delivered to the main data input of this memory via multiple 18, are immaterial in this case since the presence of an inhibiting bit in the addressed cell of memory MC will prevent any readout of the cell of memory MS identified by the contents of registers RG$_3$ and RG$_4$. With the clearing of register RG$_5$ the data input of flip-flop F$_7$ is de-energized so that this flip-flop will be reset and the voltage of lead 19 will go low upon the conduction of gate P$_4$ in response to a subsequent instruction which does not call for the emission of an inhibiting bit.

Let us assume, now, that an incoming byte from a single time slot of a frame period (e.g. one assigned to a service channel) is to be transmitted to all 256 outgoing channels. For this purpose the microprocessor sends out a multiple-connection instruction after registers RG$_1$ and RG$_2$ have been loaded with the corresponding group and channel codes. This instruction does not affect the decoder DC$_2$ but energizes only the output lead 44 of register RG$_5$ whereby flip-flop F$_6$ is set in response to the next frame-synchronizing pulse SYNC on lead 7c. The resulting de-energization of lead 54 causes the conduction of NAND gates P$_4$ and P$_6$ whereby register RG$_5$ is cleared and NAND gate P$_5$ is conditioned to pass subsequent write-enabling pulses 27 in inverted form to lead 11 and thus to the read/write input of memory MC. With these pulses the contents of registers RG$_1$ and RG$_2$ are fed to all the cells of memory MC addressed during writing by counters GC and CC of time base BT in the same order in which they are scanned during reading. Thus, the bytes delivered by multiple 16 to converter PS in the frame period of 125 μs started by that pulse SYNC are all identical and correspond to the word written in the designated cell of memory MS. For this mode of operation, of course, it is necessary that memory MS can also be read in a nondestructive manner. At the end of the frame period here considered, another pulse SYNC on lead 7c resets the flip-flop F$_6$ and thus restores the previous condition.

With the aid of a further instruction, causing simultaneous energization of output leads 44 and 45 of register RG$_5$, an inhibiting bit can be similarly entered in every cell of memory MC and can thereby block the readout of memory MS. The contents of registers RG$_1$ and RG$_2$ are again irrelevant in this case.

For diagnostic or test purposes it is sometimes desirable to transfer bytes of all incoming channels without spatial or temporal transposition, i.e. in their order of arrival, to corresponding outgoing channels so that the switching unit EC can be considered fully "transparent." This mode of operation requires only the emission of an instruction which, when entered in register RG$_5$, causes decoder DC$_2$ to de-energize its output lead 42 whereby flip-flop F$_4$ is reset by the next frame pulse SYNC on lead 7c and generates a high logic level on its output lead 52. The resulting conduction of AND gates P$_7$ and P$_8$ switches multiplexers SW$_1$ and SW$_2$ onto submultiples 7a and 7b, in parallel with multiplexers SW$_3$ and SW$_4$, during each writing phase so that all the cells of memory MC are loaded with the addresses of homologous cells of memory MS which are therefore scanned during unloading in the same order as during loading. Writing is enabled, as in the preceding two instances, for an entire frame period by a high logic level on lead 44 which consequent setting of flip-flop F$_6$.

For a purely spatial transposition, with transfer of all the bytes of a given incoming signal path in their order of arrival to a selected outgoing signal path, the group codes identifying these two paths are respectively entered in registers RG$_1$ and RG$_3$. An instruction word then stored in register RG$_5$ and detected by decoder DC$_2$ causes the de-energization of lead 43 and the resetting of flip-flop F$_5$ by the next frame pulse SYNC whereby lead 53 is energized and unblocks AND gates P$_8$ and P$_9$. Multiplexers SW$_2$ and SW$_3$ are thus switched, respectively, onto submultiple 7b carrying the channel addresses generated by counter CC and onto output multiple 48 of register RG$_3$. Voltage on lead 44 again sets the flip-flop F$_6$ for the duration of a frame period in whose writing phases the cells of memory MC identified by the group code in register RG$_3$ receive the addresses of respective cells of memory MS allocated to the channels of the group identified by the code in register RG$_1$.

Analogously to this procedure, but with energization of lead 45, the readout to a selected outgoing signal path can be blocked with the aid of a suitable instruction word. In that situation, of course, the contents of register RG$_1$ would be irrelevant.

When the microprocessor sends an initiation pulse on lead 55, its trailing edge will set the normally reset flip-flop F$_8$ whereupon the next frame pulse SYNC on lead 7c will also set the flip-flop F$_9$ in cascade therewith. With the third flip-flop F$_{10}$ of the cascade still reset, AND gate P$_{11}$ conducts and resets the flip-flop F$_8$ while setting flip-flops F$_6$ and F$_7$. This results in the clearing of register RG$_5$ (in the event that any instruction word is stored therein) and in the unblocking of gate P$_5$ for the transmission of write-enabling pulses to memory MC; since lead 19 is energized concurrently by the setting of flip-flop F$_7$, an inhibiting bit is entered in all the cells of memory MC in the course of a frame period whereby the readout of memory MS is blocked as described above. At the end of the frame period, another pulse SYNC sets the flip-flop F$_{10}$ and resets the flip-flop F$_9$, thus cutting off the gate P$_{11}$; since flip-flop F$_{10}$ remains set for another frame period, an immediate repetition of this procedure is avoided even if an intervening second initiation pulse should have prevented the resetting of flip-flop F$_9$.

With none of the flip-flops F$_3$–F$_5$ reset during this initiation procedure, multiplexers SW$_1$–SW$_4$ are in their normal positions so that the contents of registers RG$_1$ and RG$_2$ will be loaded into the cells of memory MC together with the inhibiting bit in respective writing phases.

The ability to block the readout of incoming code words to a selected outgoing channel or group—or possibly to all 256 channels—during a certain frame period allows the incorporation of unit EC of FIG. 1 into a larger switching array as shown by way of example in FIGS. 3 and 4.

FIG. 3 illustrates an assembly of four identical units $EC_1-EC_4$ enabling the establishment of communication between PCM channels of two sets of incoming signal paths 101-108, 109-116 and of two sets of outgoing signal paths 201-208, 209-216. Incoming signal paths 101-108 are connected in parallel to corresponding inputs of units $EC_1$ and $EC_2$ whereas incoming signal paths 109-116 are connected in parallel to corresponding inputs of units $EC_3$ and $EC_4$. Conversely, outgoing signal paths 201-208 are connected in parallel—via respective OR gates not shown—to corresponding outputs of units $EC_1$ and $EC_3$ whereas outgoing signal paths 209-216 are similarly connected to corresponding outputs of units $EC_2$ and $EC_4$. A command bus 117 common to all these units supplies them with control signals, data words and instruction words.

When, for example, a byte arriving in a given time slot over path 101 is to be transmitted to path 208, the control network (LC) of unit $EC_1$ is commanded to perform the transfer while the corresponding network of unit $EC_2$ is instructed to inhibit the readout of the cell concurrently receiving that byte; at the same time the unit $EC_3$ is prevented from feeding any byte to path 208.

FIG. 4 shows a line concentrator with three such identical units $EC_5$, $EC_6$ and $EC_7$ having individual sets of incoming signal paths 301-308, 309-316 and 317-324 working into a common set of outgoing signal paths 401-408, again by way of nonillustrated OR gates. A common command bus 325 from microprocessor MP selectively enables one unit at a time to transfer a byte from one of its incoming channels to a specific outgoing channel.

The individual switching units as well as multi-unit arrays such as those shown in FIGS. 3 and 4 can be readily realized with integrated circuitry.

Figure 5:
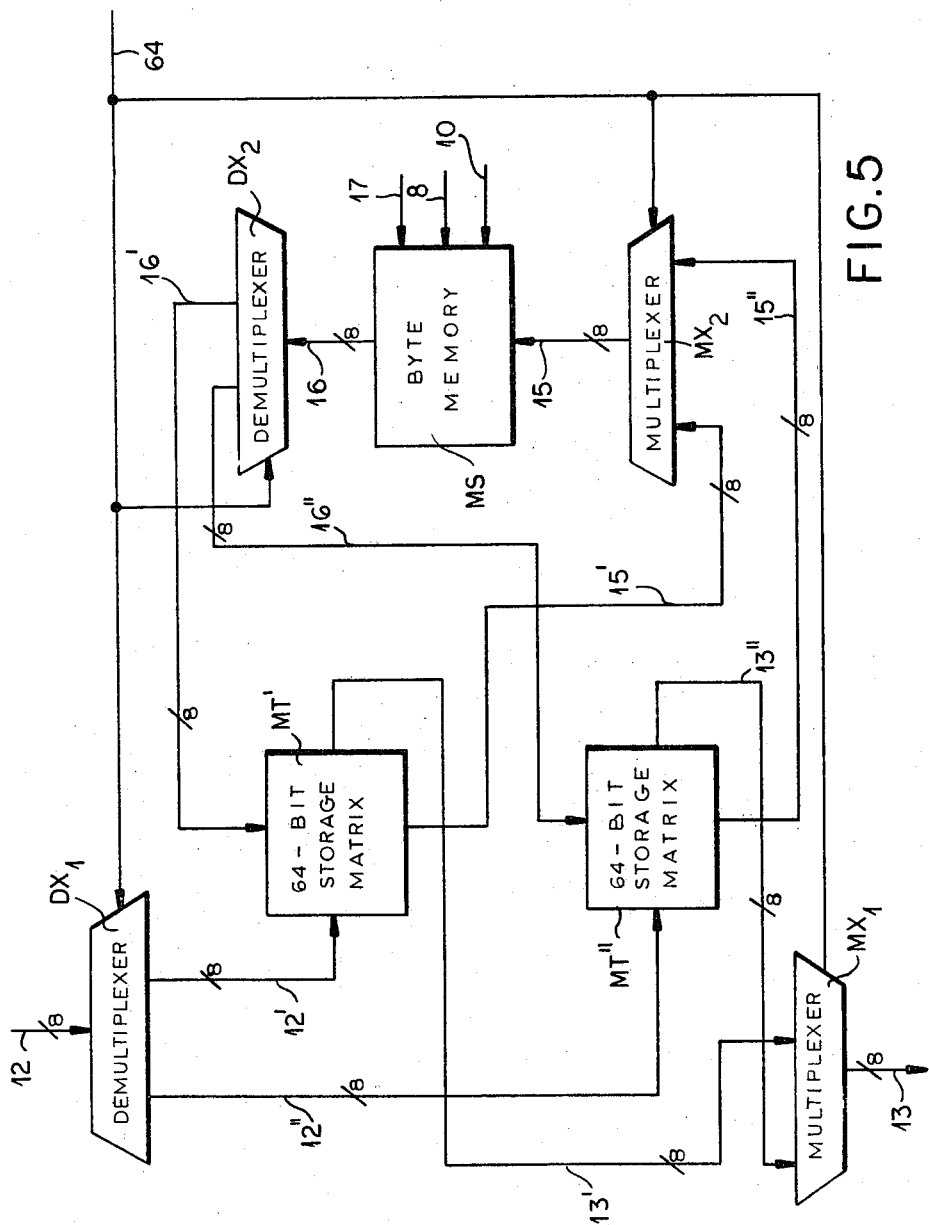
FIG. 5 is a block diagram showing conversion means with two matrices for parallelizing incoming bits and serializing outgoing bits.

Reference will now be made to FIG. 5 for a description of a dual-matrix converter adapted to replace the two converters SP and PS shown in FIG. 1. The converter of FIG. 5 comprises two matrices MT' and MT'' each having eight rows and eight columns of eight storage elements each. The eight incoming signal paths 12 are alternately connectable by a demultiplexer $DX_1$ to two 8-lead multiples 12' and 12'' terminating at the row inputs of matrices MT' and MT'', respectively; two similar multiples 13' and 13'' extend from the corresponding row outputs to a multiplexer $MX_1$ for alternate connection to the eight outgoing signal paths 13. Input multiple 15 of memory MS is alternately connectable to the column outputs of matrices MT' and MT'' via respective multiples 15', 15'' and a multiplexer $MX_2$; the output multiple 16 of this memory is alternately connectable to the column inputs of these matrices by way of a demultiplexer $DX_2$ and respective multiples 16', 16''. An output lead 64 of time base BT (FIG. 1), terminating at switching inputs of multiplexers $MX_1$, $MX_2$ and demultiplexers $DX_1$, $DX_2$, carries a square wave with a frequency of 128 KHz whereby one matrix is connected between signal paths 12 and 13 while the other matrix is connected across multiples 15 and 16 in one time slot, the connections being interchanged in the next time slot. Nonillustrated control inputs of these matrices are connected to other output leads of the time base for horizontal stepping at the bit rate during connection across the signal paths and for vertical stepping at twice that rate during connection across memory MS.

In a time slot in which demultiplexer $DX_1$ joins the signal paths 12 to multiple 12' while multiplexer $MX_1$ links the multiple 13' with signal paths 13, the eight incoming bytes are fed bit by bit into respective rows of matrix MT' while the eight bytes previously stored therein are being serially discharged at the same rate. In the same time slot the eight bytes stored in respective rows of matrix MT'' are sequentially transferred to the assigned cells of memory MS via multiplexer $MX_2$ and as many bytes (possibly including some of those just entered) are retransferred via multiplexer $DX_2$ to the vacated rows of that matrix. In the following time slot the roles of the two matrices are reversed. As before, writing and reading phases may alternate during each bit interval; however, it is also possible to empty the matrix in the first half and to refill it in the second half of such a time slot during writing and reading phases of about 2 $\mu$s each, with suitable modification of the timing of the switching and read/write pulses emitted by the time base on leads 5, 10 and 27 as well as a change in the mode of operation of counters GC and CC (FIG. 1). The latter solution, while requiring somewhat more complex circuitry, has the advantage that minor offsets in the relative time positions of the bit streams on the incoming signal paths can be more readily tolerated.

We claim:

1. A switching unit for the selective transfer of binary code words from a plurality of incoming signal paths, arriving simultaneously during individual time slots of a recurrent frame period assigned to respective communication channels, to a like plurality of outgoing signal paths under the control of instructions from an associated command unit, comprising:

first memory means having cells for the temporary storage of all the code words arriving during one frame period over all said incoming signal paths, said first memory means being provided with loading means connectable to said incoming signal paths for inscribing arriving code words in said cells and with unloading means connectable to said outgoing signal paths for reading out code words inscribed in said cells;

timing means for controlling said loading means to fill said cells in a predetermined order with arriving code words during each frame period in at least one writing phase per time slot;

second memory means for the storage of routing information identifying the cells of said first memory means whose contents are to be consecutively read out to respective outgoing signal paths by said unloading means during a frame period in at least one reading phase per time slot, said second memory means being provided with input means for receiving said routing information in a writing phase and with output means controlled by said timing means for delivering said routing information to an address input of said first memory means during successive reading phases; and decoding means connected to said input means for enabling the transmission of said routing information to said second memory means during a writing phase in response to instructions from said command unit, said decoding means including circuitry responsive to certain of said instructions for supplementing said routing information with an inhibiting bit transmissible by said output means and said address input to a corresponding cell of said first memory means for blocking the transfer of the contents thereof to any of said outgoing signal paths.

2. A switching unit as defined in claim 1, further comprising switchover means controlled by said decoding means for selectively connecting at least part of said input means during a writing phase to a data store, containing routing information supplied by said command unit, in the presence of one type of instruction and to said timing means for a readout of said cells in the order of their loading in the presence of another type of instruction.

3. A switching unit as defined in claim 2 wherein said data store comprises a first register for the storage of bits identifying a channel group assigned to an incoming signal path, a second register for the storage of bits identifying an incoming channel, a third register for the storage of bits identifying a channel group assigned to an outgoing signal path, and a fourth register for the storage of bits identifying an outgoing channel; said timing means including a group counter and a channel counter; said input means including a first and a second set of conductors extending to a loading input of said second memory means and a third and a fourth set of conductors extending to an address input of said second memory means; said switchover means comprising a first multiplexer for selectively switching said first set of conductors between said first register and said group counter, a second multiplexer for selectively switching said second set of conductors between said second register and said channel counter, a third multiplexer for selectively switching said third set of conductors between said third register and said group counter, and a fourth multiplexer for selectively switching said fourth set of conductors between said fourth register and said channel counter, said multiplexers being controlled by said timing means in each reading phase to connect said first and second sets of conductors to said first and second registers and to connect said third and fourth sets of conductors to said group counter and said channel counter, respectively.

4. A switching unit as defined in claim 3 wherein said first and second multiplexers, said second and third multiplexers, and said third and fourth multiplexers are interconnected for joint switching by said decoding means in response to respective instructions.

5. A switching unit as defined in claim 1, 2, 3 or 4, further comprising gating means in said circuitry controlled by said timing means for entering said inhibiting bit in every cell of said first memory means to block the readout thereof during an entire frame period in response to a special instruction from said command unit.

6. A switching unit as defined in claim 5, further comprising initiation means responsive to a signal from said command unit for operating said gating means to block said readout during a frame period preceding a new series of operations.

7. A switching unit as defined in claim 1, 2, 3 or 4 wherein each of said code words consists of a number of bits equal to the number of incoming and of outgoing signal paths, further comprising conversion means for parallelizing serially arriving bits of each incoming code word before transmitting same to said loading means and serializing bits read out in parallel from each cell of said first memory means before delivering same to said outgoing signal paths.

8. A switching unit as defined in claim 7 wherein said conversion means comprises a pair of orthogonal matrices with rows and columns of storage elements equal to the number of said bits, each of said matrices being controlled by said timing means for serial loading from said incoming signal paths and simultaneous serial unloading into said outgoing signal paths during every other time slot and for parallel transfer to and retransfer from said first memory means during intervening time slots, the loading and unloading of one matrix coinciding with the transfer and retransfer of the other matrix.

9. In combination, a plurality of switching units as defined in claim 1, 2, 3 or 4 whose respective unloading means are connected in parallel to said plurality of outgoing signal paths for the selective transfer of code words thereto from any one of said switching units during a blocking of the readout from any other switching unit by said inhibiting bit.

* * * * *